United States Patent
Chapin

(10) Patent No.: US 7,850,387 B2
(45) Date of Patent: Dec. 14, 2010

(54) SYSTEM FOR REDUCING STRESS CONCENTRATIONS IN LAP JOINTS

(75) Inventor: Clifford O. Chapin, Kent, WA (US)

(73) Assignee: The Boeing Company, Chicago, IL (US)

( * ) Notice: Subject to any disclaimer, the term of this patent is extended or adjusted under 35 U.S.C. 154(b) by 1212 days.

(21) Appl. No.: 10/905,484

(22) Filed: Jan. 6, 2005

(65) Prior Publication Data

US 2007/0016336 A1    Jan. 18, 2007

(51) Int. Cl.
*B25G 3/00*    (2006.01)
(52) U.S. Cl. ..................................... 403/286; 403/288
(58) Field of Classification Search ............... 403/286, 403/288, 393, 408.1, 410; 244/119, 120, 244/131, 132
See application file for complete search history.

(56) References Cited

U.S. PATENT DOCUMENTS

| 1,749,757 | A | * | 3/1930 | Carns ........................ 244/119 |
| 1,976,480 | A | * | 10/1934 | Carleton et al. ............ 244/124 |
| 2,029,635 | A | * | 2/1936 | Ralson |
| 2,639,788 | A | * | 5/1953 | Gustafson et al. .......... 244/131 |
| 3,755,713 | A | * | 8/1973 | Paszkowski |
| 4,760,784 | A | * | 8/1988 | Whiteside |
| 4,760,949 | A | * | 8/1988 | Elias |
| 4,767,419 | A | * | 8/1988 | Fattore |
| 5,109,777 | A | * | 5/1992 | Ohmura et al. ............. 403/341 |
| 5,297,760 | A | | 3/1994 | Hart-Smith |
| 5,518,208 | A | * | 5/1996 | Roseburg .................... 244/131 |
| 6,042,055 | A | * | 3/2000 | Messinger .................. 244/131 |
| 6,303,204 | B2 | * | 10/2001 | Mathieson |
| 6,681,466 | B2 | * | 1/2004 | David et al. |
| 6,775,895 | B2 | * | 8/2004 | Koffi et al. |
| 6,854,793 | B2 | * | 2/2005 | Few |
| 7,114,762 | B2 | * | 10/2006 | Smidler |
| 7,328,771 | B2 | * | 2/2008 | Costa et al. ................. 244/131 |

FOREIGN PATENT DOCUMENTS

| CH | 98968 | * | 5/1923 |
| EP | 143457 A2 | * | 6/1985 |

* cited by examiner

*Primary Examiner*—Victor MacArthur
(74) *Attorney, Agent, or Firm*—Ostrager Chong Flaherty & Broitman P.C.

(57) ABSTRACT

A stress concentration reduction system includes a hoop tension finger doubler coupled to a lap splice. The lap slice is formed by an first panel overlapped by a second panel. The hoop tension finger doubler is formed to fit against the panels flushly.

10 Claims, 3 Drawing Sheets

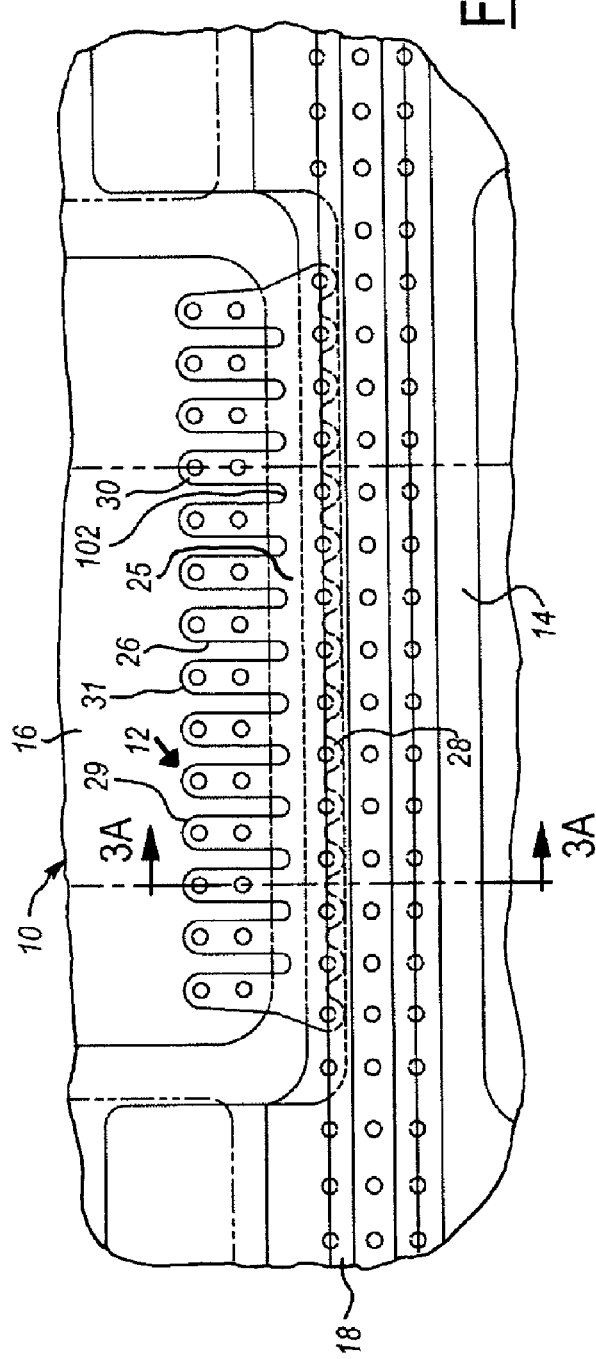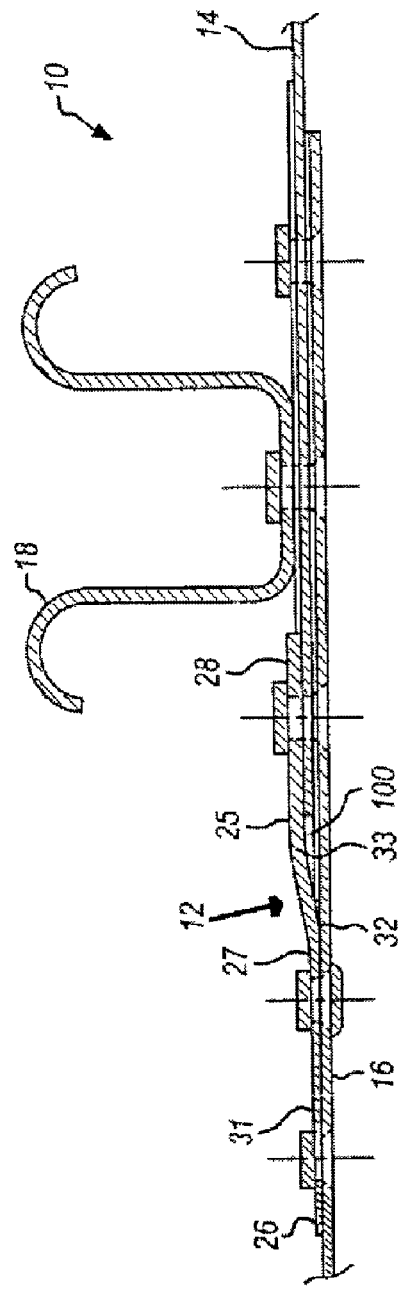
FIG. 3
FIG. 3A

SYSTEM FOR REDUCING STRESS CONCENTRATIONS IN LAP JOINTS

TECHNICAL FIELD

The present invention relates generally to material stress, and more particularly, to a system and method for reducing stress concentrations in lap joints.

Currently, aircraft fuselages are built with multiple skin panels, which are mechanically fastened (jointed) together both circumferentially and longitudinally. Longitudinal joints are fastened together through three rows of aluminum rivets (upper, middle, and lower longitudinal fastener rows), forming a single shear lap splice. The skin panels are also chemically or mechanically machined between frame bays for forming lightening pockets for weight saving.

One current problem caused during fuselage pressurization includes hoop tension stress concentrations at the edges of the chemically or mechanically machined lightening pockets and at the lower longitudinal fastener row. These stress concentrations are due to the single shear nature of the skin panel longitudinal lap joint and load line eccentricities. These stress concentrations are exacerbated by the location of chemically or mechanically machined lightening pockets. It is a constant goal for pressure vehicle design to minimize these stress concentrations.

Fuselage skin panel longitudinal single shear lap splices include a natural eccentric load transfer line. This load transfer line eccentricity generates bending stresses in the skin panel lap joint. The stresses at the edge of the chemically or mechanically machined lightening pocket are exacerbated by the relative location of this chemically or mechanically machined lightening pocket edge to the upper longitudinal row of mechanical fasteners.

The disadvantages associated with current pressure vehicle systems have made it apparent that a new stress concentration reduction system is needed. The new stress concentration reduction system should substantially minimize stress concentrations in lap joints.

SUMMARY OF THE INVENTION

In accordance with one aspect of the present invention, a stress concentration reduction system includes a hoop tension finger doubler coupled to a fuselage panel lap splice. The lap slice is formed by an upper fuselage panel overlapped by a lower fuselage panel. The hoop tension finger doubler is formed to fit against the fuselage panels flushly.

In accordance with another embodiment of the present invention, a stress concentration reduction system for a lower fuselage panel overlapping an upper fuselage panel includes a sheet including a top surface having an upper portion, a middle portion, a lower portion, a left side, and a right side. The upper portion includes a plurality of finger portions extending therefrom; and each of the plurality of finger portions is fastened to the upper fuselage panel. The lower portion is fastened to the lower fuselage panel and the upper fuselage panel and may further extend to and fasten to a fuselage stringer coupled to the panels. The sheet further includes a bottom surface opposing the top surface and a common edge for the top surface and the bottom surface.

One advantage of the present invention is that by using the aforementioned sheet, herein referred to as a hoop tension finger doubler, the stresses due to the eccentric load line and the location of the chemically or mechanically machined lightening pocket may be minimized.

Another advantage is that the hoop tension finger doubler widens the lap splice geometry thereby decreasing relative stress levels.

Additional advantages and features of the present invention will become apparent from the description that follows, and may be realized by means of the instrumentalities and combinations particularly tapered out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which:

FIG. 3 illustrates a frontal view of a stress concentration reduction system in accordance with another embodiment of the present invention;

FIG. 3A illustrates a sectional view of the stress concentration reduction system of FIG. 3, looking in the direction of 3A-3A, in accordance with another embodiment of the present invention;

DETAILED DESCRIPTION OF THE INVENTION

The present invention is illustrated with respect to a stress concentration reduction system 10, particularly suited to the aerospace field. The present invention is, however, applicable to various other uses that may require stress concentration reduction, such as any pressure vehicle system, including trains and submarines, as will be understood by one skilled in the art.

Figure 1:
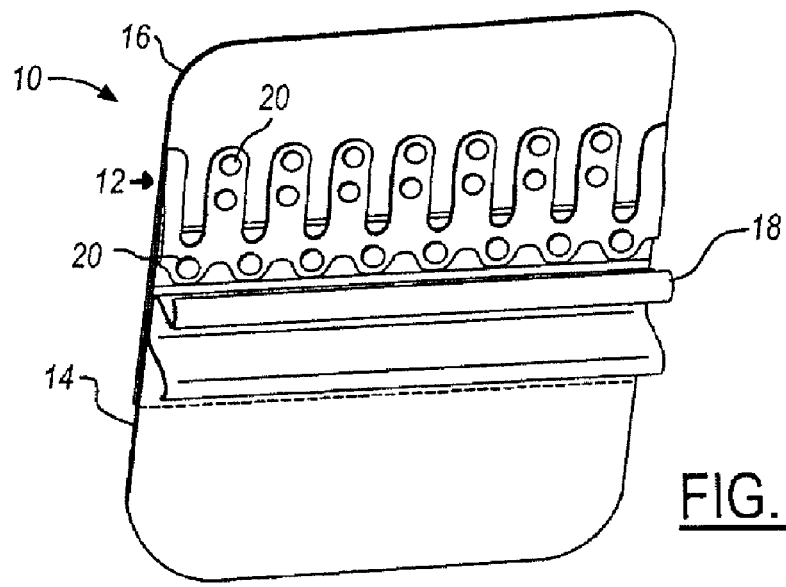
FIG. 1 illustrates a perspective view of a stress concentration reduction system in accordance with one embodiment of the present invention.
Figure 2:
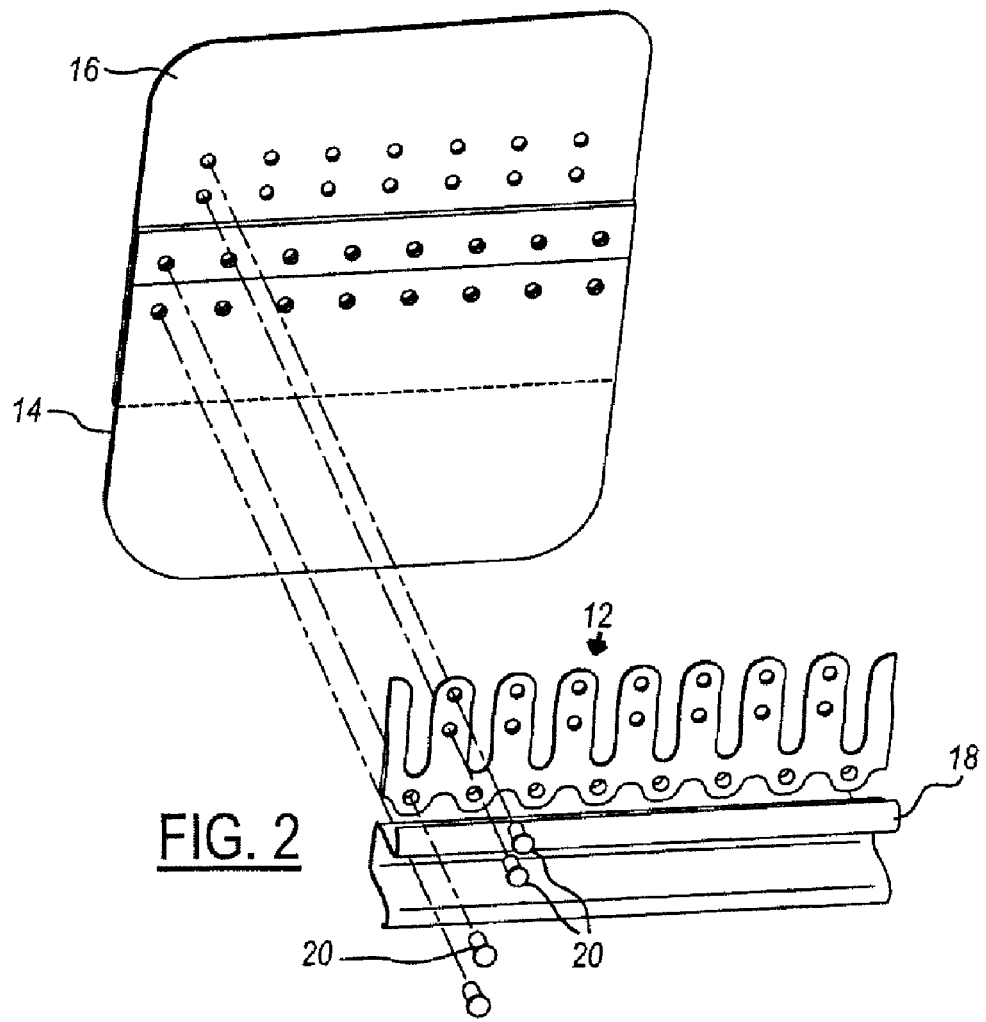
FIG. 2 illustrates an exploded view of the stress concentration reduction system of FIG. 1 in accordance with another embodiment of the present invention.

Referring to FIGS. 1 and 2, the system 10, which is a stress concentration reduction system for a aircraft fuselage, includes a hoop tension finger doubler 12 (sheet) fastened to a lower fuselage skin 14 (first skin panel) and an upper fuselage skin panel 16 (second skin panel). The hoop tension finger doubler 12 may also be coupled to a fuselage stringer 18.

As is understood in the art, the lower fuselage skin panel 14 underlays the upper fuselage skin panel 16, relative to an exterior of the pressure vehicle, and is riveted thereto. For purposes of the present invention, reference to the skin panels is relative to an interior of the pressure vehicle, as the present invention typically couples to an interior of the vehicle. Therefore, the lower skin panel is discussed as overlaying the upper skin panel. A fuselage stringer 18 is typically fastened to both the skin panels 14, 16 to strengthen the overall fuselage structure.

In accordance with one embodiment of the present invention, the hoop tension finger doubler 12 is riveted to both the upper fuselage panel 16 and the lower fuselage panel 14 through rivets 20. In accordance with another embodiment of the present invention the hoop tension finger doubler 12 may extend down and be attached to both the fuselage skin panels 14, 16 and the fuselage stringer 18. In other words, the fuselage stringer 18 may be riveted through the hoop tension finger doubler 12 and through both the skin panels 14, 16.

Referring to FIGS. 3 and 3A, a planform view and a cutaway view of one embodiment of the present invention are illustrated. The stress concentration reduction system 10 includes a sheet 12 including a top surface 25 having an upper portion 26; a middle portion 27; a lower portion 28; a left side 29; and a right side 30. The upper portion 26 and part of the illustrated middle portion includes a plurality of finger portions 31 extending therefrom; and each of the plurality of finger portions 31 is fastened to the second skin panel 16 and may further extend to and fasten to the fuselage stringer 18. The sheet 12 further includes a bottom surface 32 opposing the top surface 25 and a common edge 33 for the top surface 25 and the bottom surface 32

The common edge 33 is lesser in thickness in an area of the finger portions 31 than in an area of the lower portion 28. The common edge 33 is formed such that each of the pluralities of finger portions 31 flushly contact the second skin panel 16, and the lower portion 28 flushly contacts the first skin panel 14.

Each of the plurality of finger portions 31 may be equal in length or include a combination of varying lengths. Further, each of the plurality of finger portions 31 is either rounded, tapered, or squared at their respective ends.

The hoop tension finger doubler 12 may be installed between fuselage frame bays at skin panel lap splices. The hoop tension finger doubler 12 upper two rows of fasteners are installed with, for example, countersunk rivets or "button" head aluminum rivets. The hoop tension finger doubler 12 lower row of fasteners uses the existing lap splice upper row fastener locations, these existing fasteners are removed and replaced with longer aluminum rivets. The hoop tension finger doubler 12 is installed using aluminum rivets applying corrosion preventative sealant 100 filling the cavity between the hoop tension finger doubler 12 and the skin panel assembly. All fasteners are installed per typical aerospace rivet installation specifications. The hoop tension finger doubler 12 may be installed in an area of a chemically or mechanically machined skin panel lightening pocket 102 to strengthen the area around the pocket on the skin panels 14, 16.

The hoop tension finger doubler 12 may be manufactured from any known alloy and finished with, for example, corrosion protective paint. In accordance with one embodiment of the present invention, the hoop tension finger doubler 12 thickness varies from 0.030/0.050 inches thick to approximately 0.100/0.120 inches thick. The hoop tension finger doubler 12 is joggled to fit onto the skin panel lap splice. The periphery of the hoop tension finger doubler 12 is scalloped with "finger portions" insuring that the hoop tension finger doubler 12 does not add stiffness longitudinally to the skin panel assembly.

Figure 4A:
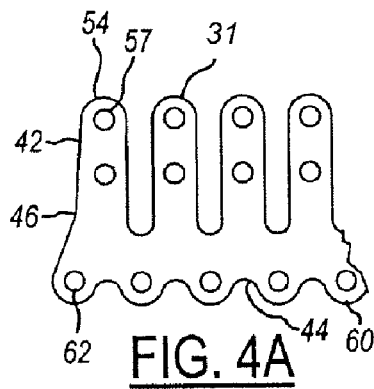
FIG. 4A illustrates a hoop tension finger doubler in accordance with another embodiment of the present invention.
Figure 4B:
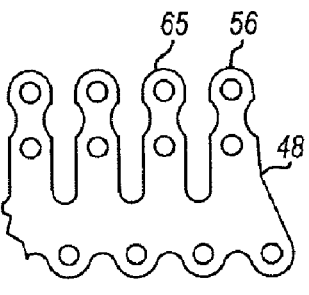
FIG. 4B illustrates a hoop tension finger doubler in accordance with another embodiment of the present invention.
Figure 4C:
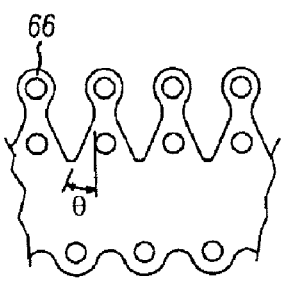
FIG. 4C illustrates a hoop tension finger doubler in accordance with another embodiment of the present invention.

Referring to FIGS. 4A, 4B, 4C, 5A, 5B, 5C, and 6A, 6B, 6C, alternate embodiments of the hoop tension finger doubler are illustrated in accordance with other embodiments of the present invention. Regarding FIGS. 4A, 4B, and 4C, the hoop tension finger doubler includes an upper edge 42, a lower edge 44, a left edge 46, and a right edge 48. The upper edge 42 includes a plurality of finger portions 31. In one embodiment of the present invention all the finger portions 31 are symmetrical, however various alternate embodiments of the finger portions may also be included in accordance with the present invention, such as is illustrated in FIGS. 4A, 4B, and 4C having the left edge 46 and the right edge 48 tapered away from each other resulting in finger portions 54 and 56 including an increased width and slightly different size than the rest of the plurality of finger portions 31. Each of the plurality of finger portions 31, 54 and 56 is embodied with two rivet holes 57 receiving rivets, bolts, or fasteners. Alternate embodiments of the finger portions 31 include any number of rivet holes.

The finger portions 54 may be identical or include a combination of various finger portions. Various embodiments are illustrated including finger portions 52 having parallel sides (FIG. 4A), finger portions 65 having indented sides (FIG. 4B), and finger portions 66 having indented and tapered sides (FIG. 4C).

The lower edge 44 is embodied as a scalloped edge including a plurality of rounded projections 60 or scallops. Each of the rounded projections includes a rivet hole 62 or fastener opening for receiving a rivet or other fastener known in the art. Important to note is that bottom edge may also be flat or may include various other shapes known in the art projecting from the bottom edge 44.

Figure 5A:
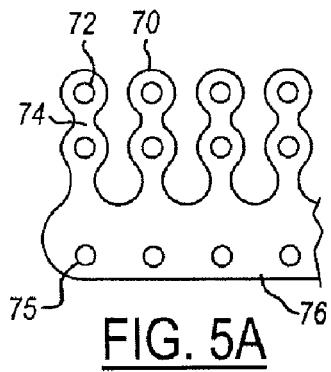
FIG. 5A illustrates a hoop tension finger doubler in accordance with another embodiment of the present invention.
Figure 5B:
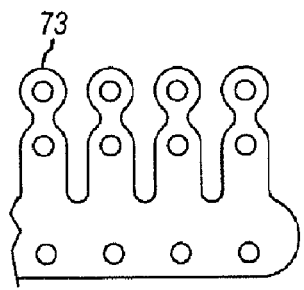
FIG. 5B illustrates a hoop tension finger doubler in accordance with another embodiment of the present invention.
Figure 5C:
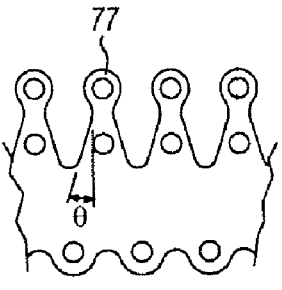
FIG. 5C illustrates a hoop tension finger doubler in accordance with another embodiment of the present invention.

Referring to FIGS. 5A, 5B, and 5C, alternate embodiments of the hoop tension finger doubler 69 are illustrated. In accordance with FIG. 5A, the plurality of finger portions 70 each define two rivet openings 72 such that the finger portions 70 have increased width in an area of the openings 72. In accordance with FIG. 5B, the finger portions 73 have increased width in an area of only one of the openings and parallel sides in an area of the other opening. In accordance with FIG. 5C, the finger portions 77 have increased width in an area of only one of the openings and tapered sides in an area of the other opening. As with the previous embodiments, FIGS. 5A, 5B, and 5C also illustrate a row 75 of rivet openings at a lower portion 76 of the hoop tension finger doubler.

Figure 6A:
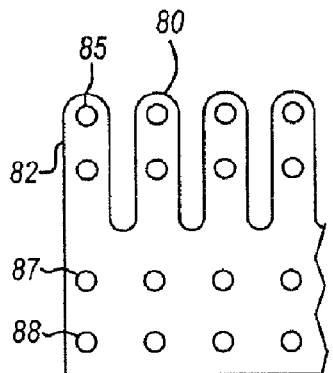
FIG. 6A illustrates a hoop tension finger doubler in accordance with another embodiment of the present invention.
Figure 6B:
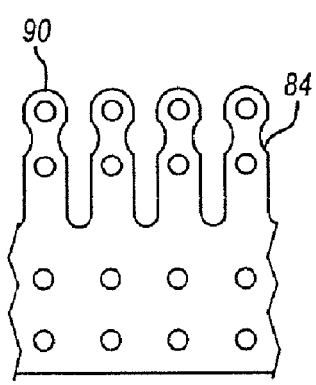
FIG. 6B illustrates a hoop tension finger doubler in accordance with another embodiment of the present invention.
Figure 6C:
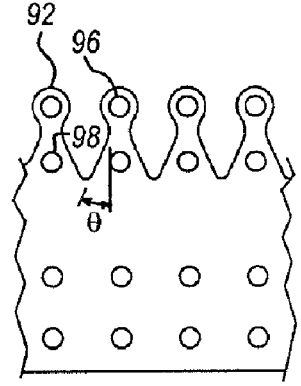
FIG. 6C illustrates a hoop tension finger doubler in accordance with another embodiment of the present invention.

Referring to FIGS. 6A, 6B, and 6C, still another embodiment of the hoop tension finger doubler is illustrated. As illustrated in FIG. 6A, the plurality of finger portions 80 of the doubler are substantially symmetrical such that the left edge 82 and the right edge 84 are parallel. Further, in accordance with this embodiment, the doubler extends such that it may be fastened with two fasteners or rivets, through fastener openings 85 in the finger portions 80, to the upper fuselage skin panel and with two rivets, through fastener openings 87, 88 in the lower portion 81 of the doubler, to the lower fuselage skin panel. The lower most fastener opening 88 will be coupled to both skin panels 14, 16 and the fuselage stringer 18. In FIG. 6A, the Finger portions 80 include parallel sides. In FIG. 6B, the Finger portions 90 include indented sides. In FIG. 6C, the finger portions 92 include an indentation below the first opening 96 and tapered sides in an area of the second opening 98. One skilled in the art will realize that numerous alternate finger portion variations are included within the scope of the present invention.

From the foregoing, it can be seen that there has been brought to the art a new and improved stress concentration reduction system 10. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration detection and control. Numerous and other arrangements would be evident to those skilled in the art without departing from the scope of the invention as defined by the following claims

What is claimed is:

1. A joint for reducing stress concentration in a lap splice formed in a skin of a pressure vehicle by overlapping a first skin panel and a second skin panel in an overlap area, the joint comprising a hoop tension finger doubler coupled to the first skin panel and the second skin panel, and fasteners coupling the hoop tension finger double to the first skin panel and the second skin panel, the hoop tension finger doubler being generally planar in shape, thereby defining a plane, the hoop tension finger doubler comprising:

an upper portion comprising a plurality of finger portions fastened to an interior surface of the first skin panel, at least one of said finger portions defining at least one fastener opening;

a lower portion fastened to an interior surface of the second skin panel in the overlap area and to the first skin panel through the second skin panel, the lower portion defining a plurality of fastener openings and having a thickness that is larger than a thickness of the upper portion;

a middle portion between the upper portion and the lower portion comprising a joggle offsetting the upper portion from the lower portion in a direction perpendicular to the plane of the hoop tension finger doubler, such that a bottom surface of the hoop tension finger doubler contacts both the interior surface of the first skin panel and the interior surface of the second skin panel; and corrosion preventative sealant filling a cavity between said hoop tension finger doubler, said first skin panel, and said second skin panel.

2. The joint of claim 1, wherein each of said plurality of finger portions define two fastener openings.

3. The joint of claim 2, wherein said each of said plurality of finger portions are: wider in an area of each of said fastener openings, wider in an area of only one of said fastener openings, or tapered in an area of one of said fastener openings.

4. The joint of claim 1, wherein each of said plurality of finger portions are substantially equal in length.

5. The joint of claim 1, wherein each of said plurality of finger portions is either rounded, tapered, or squared.

6. The joint of claim 1, wherein said each of said plurality of finger portions are: wider in an area of each of said fastener openings, wider in an area of only one of said fastener openings, or tapered in an area of one of said fastener openings.

7. The joint of claim 1, wherein a left side of the hoop tension finger doubler is flared away from a right side of the hoop tension finger doubler.

8. A joint according to claim 1, wherein fasteners fasten each of the plurality of finger portions to the interior surface of the first skin panel through the at least one fastener opening in each of the plurality of finger portions.

9. A joint for reducing stress concentration in a lap splice formed in a skin of a pressure vehicle by overlapping a first skin panel and a second skin panel in an overlap area, the joint comprising a hoop tension finger doubler coupled to the first skin panel and the second skin panel, and fasteners coupling the hoop tension finger double to the first skin panel and the second skin panel, the hoop tension finger doubler being generally planar in shape and thereby defining a plane, the hoop tension finger doubler comprising:

an upper portion comprising a plurality of finger portions fastened to an interior surface of the first skin panel, at least one of said finger portions defining at least one fastener opening;

a lower portion fastened to an interior surface of the second skin panel in the overlap area and to the first skin panel through the second skin panel, the lower portion defining a plurality of fastener openings and having a thickness that is larger than a thickness of the upper portion; and a middle portion between the upper portion and the lower portion comprising a joggle offsetting the upper portion from the lower portion in a direction perpendicular to the plane of the hoop tension finger doubler, such that a bottom surface of the hoop tension finger doubler contacts both the interior surface of the first skin panel and the interior surface of the second skin panel;

wherein the lower portion comprises a scalloped bottom edge, the scalloped bottom edge and the plurality of finger portions providing reduced longitudinal stiffness to the skin.

10. The joint of claim 9, wherein the scalloped bottom edge defines scalloped portions in the lower portion, each of said scalloped portions defining a fastener opening such that the lower portion is coupled to the first skin panel and the second skin panel through said fastener openings of said scalloped portions.

* * * * *